March 18, 1952     R. C. SABINS     2,589,578
RADIO DIRECTION FINDING APPARATUS
Filed April 15, 1946     3 Sheets-Sheet 1

INVENTOR.
ROLLAND C. SABINS
BY
Reynolds + Beach
ATTORNEYS

March 18, 1952 R. C. SABINS 2,589,578
RADIO DIRECTION FINDING APPARATUS
Filed April 15, 1946 3 Sheets-Sheet 2
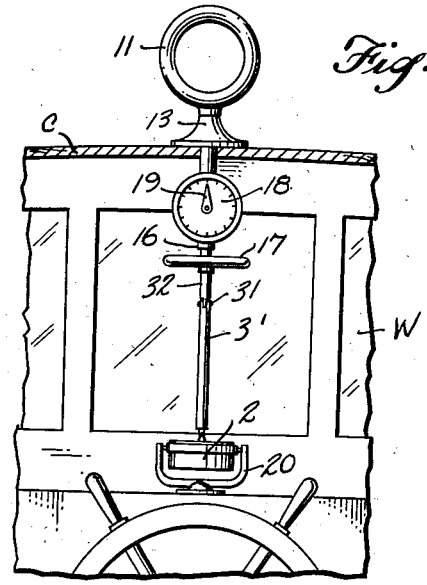
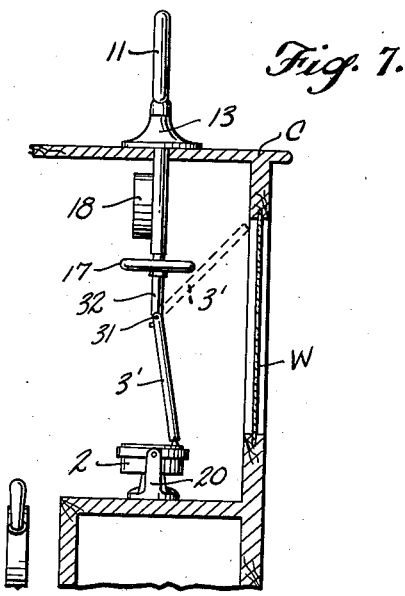
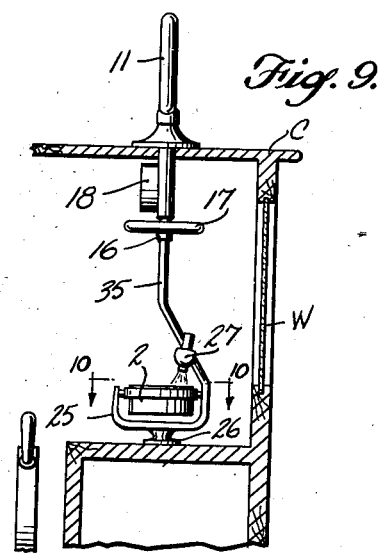
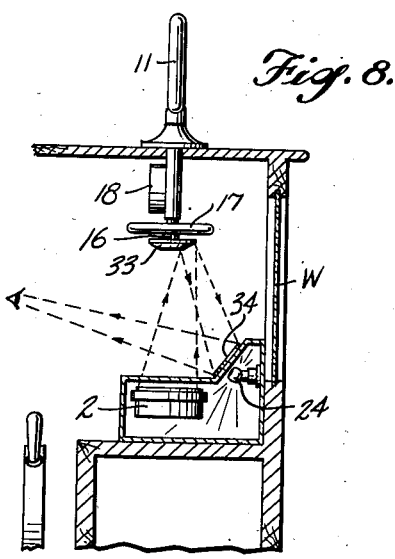
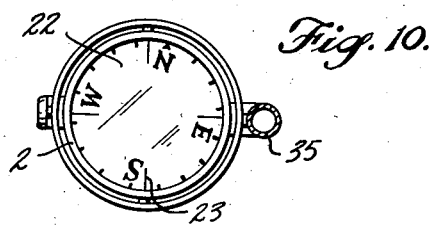
INVENTOR.
ROLLAND C. SABINS
BY
ATTORNEYS March 18, 1952      R. C. SABINS      2,589,578
RADIO DIRECTION FINDING APPARATUS
Filed April 15, 1946      3 Sheets—Sheet 3

INVENTOR.
ROLLAND C. SABINS
BY
Reynolds & Beach
ATTORNEYS

Patented Mar. 18, 1952

2,589,578

UNITED STATES PATENT OFFICE 2,589,578

RADIO DIRECTION FINDING APPARATUS

Rolland C. Sabins, Seattle, Wash.

Application April 15, 1946, Serial No. 662,123

7 Claims. (Cl. 343—115)

Direction finding radio equipment has been utilized on ships and airplanes heretofore, but the loop or radio directive antenna of such equipment has been oriented with the craft, such as a ship or an airplane, so that it was not a true direction finder, but rather gave a reading of the angle between the center line of the craft and the direction from it of the radio station located by the direction finder. It has been customary to determine the heading of a ship at the same time that the radio station direction reading is taken, and from such direction and the heading to compute the actual bearing of the radio station. From two or more such bearings a fix of the craft's position may be obtained.

It is the principal object of my invention to coordinate the direction finding equipment with the craft's navigational compass, which is basically an accurate instrument, and is compensated for errors, so that a direct reading of the radio station bearing from the craft can be obtained irrespective of its heading or change of heading, subject only to correction for the magnetic declination at the particular location of the craft.

It is especially an object to coordinate the radio direction finding equipment with the navigational compass of the craft by a simple position arrangement of such compass and the loop antenna of the direction finding radio receiver rotatable about an upright axis. Specifically the rotative axis of the antenna is aligned with the bearing or rotative axis of the compass card.

Not only is the position of the radio loop antenna oriented with respect to the craft's navigational compass, but the attitude indicating mechanism for the antenna defines an index which cooperates with such compass in determining the bearing of a radio station, and may also be arranged to serve as the normal craft heading index or lubber's line for the craft's compass.

Another object of my invention is to accomplish the results described above by the use of simple mechanism.

Other advantages of my direction finding equipment will be discussed in the following description of representative forms of mechanism.

Figure 6 is a rear elevation view, and Figure 7 is a side elevation view, of still a different type of direction finding equipment embodying my invention.

Figure 8 is a side elevation view of another form of radio direction finding equipment utilizing a modified type of my invention.

Figure 9 is a side elevation view of still a different embodiment of my invention in radio direction finding equipment, and Figure 10 is a plan view of a portion of that device taken on line 10—10 of Figure 9.

Figure 1:
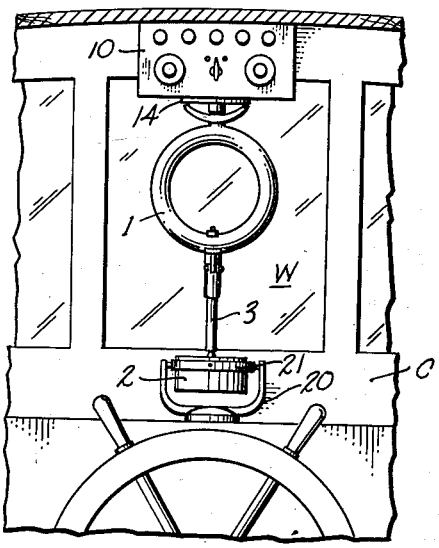
Figure 1 is a rear elevation view.

While the radio direction finding equipment of my invention is valuable for use in the navigation of aircraft, I have illustrated in the drawings various types of installations particularly adapted for shipboard use. The same principles would apply, however, to aircraft radio direction finding equipment. The term "craft" as employed in this specification, therefore, includes both watercraft and aircraft.

Direction finding radio equipment customarily employed on shipboard is generally one of three principal types. In the first type the loop or other directional antenna is supported directly from and depends below the radio receiver, such an antenna 1 being shown in Figures 1 and 2 beneath the radio receiver 10. The second type of installation, shown in Figures 3, 4, 11, and 12, incorporates a loop antenna 11 directly associated with the radio receiver 12, but having an additional support, such as the base 13, mounted on the roof of the cabin C. The third principal type of equipment incorporates a radio receiver mounted in some location remote from the loop antenna 11, shown in Figures 6, 7, 8 and 9, which antenna is supported by a base 13 mounted on the roof of the cabin C, like the antenna structure of Figures 3, 4, 11 and 12.

In each type of conventional direction finding radio equipment the loop antenna is supported for rotation about an upright axis, and an indicator is provided to designate the rotative position of the antenna relative to the center line or heading of the craft. Such indicator may include a plate 14 mounted on the bottom of the radio receiver 10, shown in Figures 1 and 2, which is graduated in degrees. Cooperating with this disk is an index pointer or indicator 15, located in a plane perpendicular to the plane of the loop. When the loop antenna 1 is disposed in a plane perpendicular to the longitudinal axis of the craft, as in the position of Figures 1 and 2, the pointer 15 will register with either the zero or the 180-degree mark on disk 14. As the direction of the loop antenna is altered by swinging it about an upright axis, the amount of angular departure from the position shown in Figures 1 and 2 will be indicated by the pointer 15 on the graduated plate 14.

Figure 2:
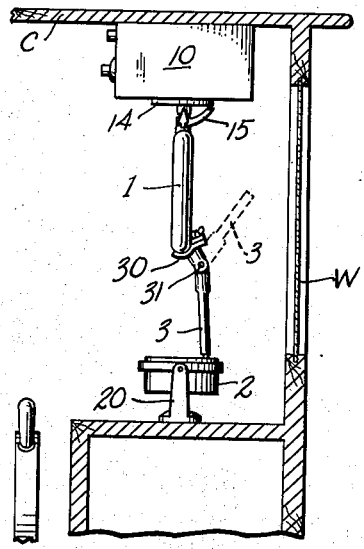
Figure 2 is a side elevation view, of one form of radio direction finding equipment incorporating my invention.
Figure 3:
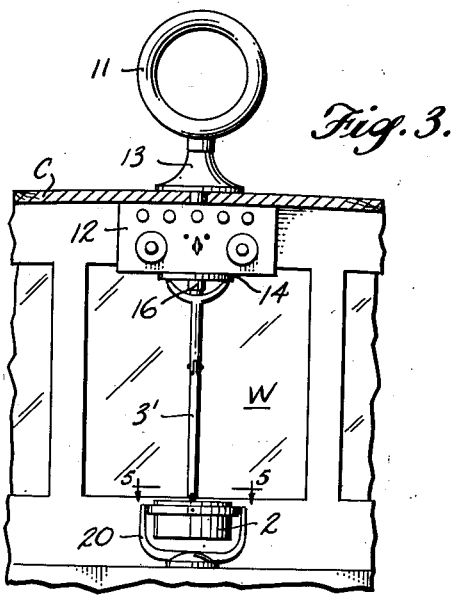
Figure 3 is a rear elevation view.
Figure 4:
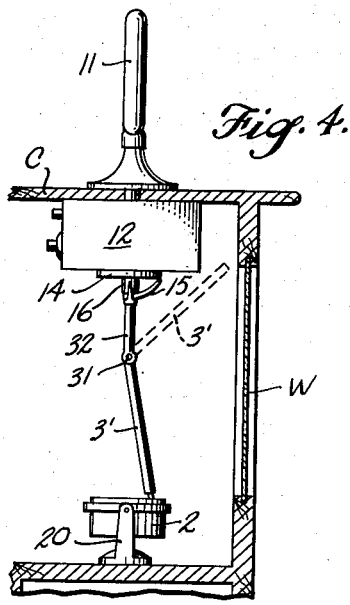
Figure 4 is a side elevation view, of a different form of radio direction finding equipment to which my invention is applied.
Figure 11:
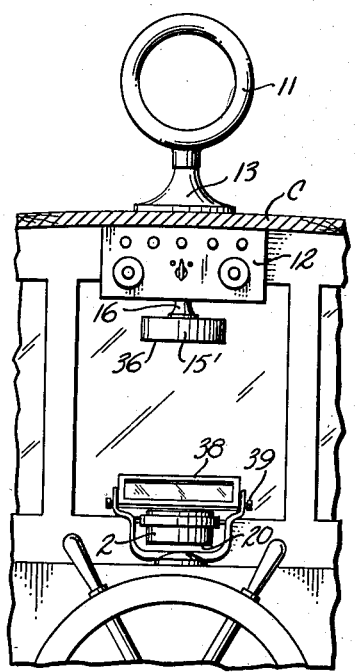
Figure 11 is a rear elevation view.
Figure 12:
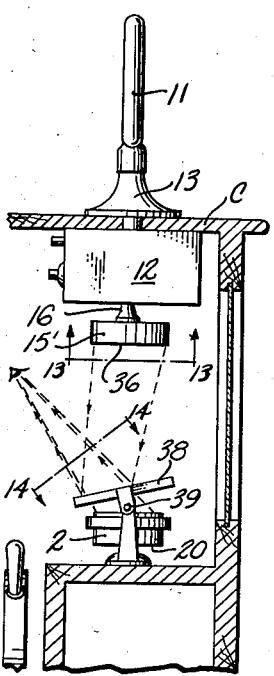
Figure 12 is a side elevation view, of still a different modification of my invention in a radio direction finder.
Figure 13:
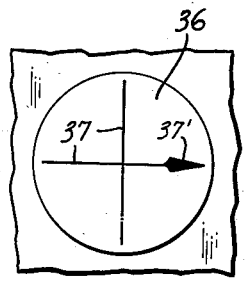
Figure 13 is an inverted plan view of part of the mechanism shown in Figure 12 taken along line 13—13 of that figure.
Figure 14:
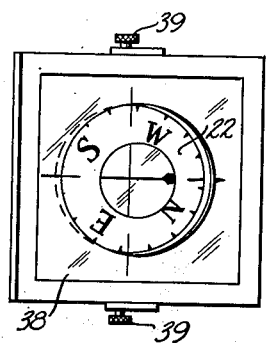
Figure 14 is a view of a portion of the mechanism on line 14—14 of Figure 12.

In the type of radio direction finder shown in Figures 3, 4, 11 and 12 a rotative stem 16, integral with the loop antenna 11, projects downward through the radio receiving set. In Figures 3 and 4 the shaft carries the pointer 15 cooperating with the graduated disk 14 mounted on the bottom of the radio receiver to indicate the attitude of the loop antenna relative to the center line of the craft, just as in the case of the mechanism shown in Figures 1 and 2, as described above. In Figures 11 and 12 shaft 16 merely carries a head 15', which preferably is circular, and has crosshairs on it corresponding to the pointer or pointers 15.

In the form of mechanism shown in Figures 6 and 7 the loop antenna 11 is mounted in the same manner as that shown in Figures 3 and 4, and its shaft 16 carries a wheel 17 which can be turned to facilitate rotation of the antenna. In this instance the disk 18, graduated in degrees, is mounted on the loop antenna support 13, and the pointer 19 cooperating with the dial 18 is geared to shaft 16 by gearing having a one to one movement ratio. Again, therefore, when the plane of loop antenna 11 is perpendicular to the longitudinal axis of the craft, the pointer 19 will register with either the zero or the 180-degree graduation of the dial.

The different locations of the radio receiving set and the types of loop antenna mounting described are conventional, but the application of my invention varies with the nature of such receiver and antenna installation. In each intance, however, the principal requisite is that the rotative axis of the loop antenna be aligned with the bearing or rotative axis of the compass card of the craft's navigational compass, or that such rotative axes be correlated physically in some manner, such as by employing a mirrored reflection either of the loop antenna attitude indicator, or of the compass card, superimposed upon the other of these elements, or by superimposing mirrored reflections of both elements.

Although the correlation of an antenna attitude indicator and of the compass card might be made in different ways, as listed above, in each of the installations illustrated in the drawings the loop antenna, its attitude indicator, and the compass card of the craft's navigational compass all rotate about a common axis. Referring particularly to the arrangement shown in Figures 1 and 2, the antenna 1, the antenna attitude pointer 15, and the bearing for the card of the main ship's compass 2, are in vertical alignment. Such alignment is maintained irrespective of the rolling or pitching movement of the ship, although the case of the compass remains substantially level because it is supported from its base 20 by gimbal rings 21. The tilt of the compass card, or of the casing 2, or both, relative to the common axis of rotation of the antenna 1 and of the compass card does not appreciably displace the compass card's rotative axis.

Figure 5:
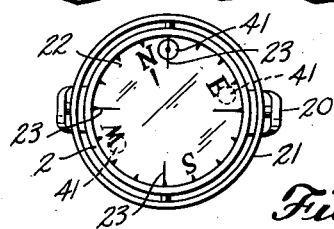
Figure 5 is a plan view of a portion of this mechanism taken on line 5—5 of Figure 3.

The mechanical correlation between the rotation of the loop antenna about its axis and the compass card may be effected by mounting on the loop antenna an index member which cooperates with the card of the compass 2. While a single arrow closely overlying the compass and suspended from the antenna would serve as its attitude indicator index, in the mechanism shown in Figures 1 and 2 this index member is in the from of a tube 3 which is carried by the loop antenna, such as being secured to its lower portion by a suitable clamp 30. This tube contains a light projected through a lens system to form an indicating pattern on the compass card, such, for example, as the bull's-eye 41, shown in Figure 5. The lower end of this tube is disposed eccentrically of the common rotative axis of the loop antenna and the compass card, so that as the antenna is rotated its light pattern index will sweep the periphery of the compass card.

To locate the antenna attitude indicator in this manner the light tube may either be offset from the rotative axis of the antenna, or inclined relative to such axis, or both. The tube 3, as shown in Figure 2, is both inclined and offset. The degree of the tube's inclination may be adjusted as desired to locate the light projection index 41 in the proper position radially of the compass card by swinging the tube about pivot 31, by which it is connected to the bracket 30. This pivot mounting of the tube also enables it to be swung upward out of the way into the inoperative position indicated in broken lines in Figure 2, when it is desired to clear the space above the compass.

The construction of the compass 2 as illustrated in all of Figures 1 to 5 is standard, as is the base 20 and gimbal ring mounting 21. The compass card 22 is pivoted at its center and is immersed in a liquid. As the heading of the craft is altered the case of the compass is rotated relative to the compass card, and the lubber lines 23 move angularly around the card to indicate the change in heading of the craft. The fore and aft lubber lines are oriented in a direction parallel to the longitudinal axis of the craft.

In the operation of my direction finding equipment the antenna 1 will be rotated about its axis until its plane is perpendicular to the bearing of the radio transmitting station on which the bearing is being taken, and the axis of the antenna loop is aligned with such station. Tube 3 will swing with the antenna to move the light pattern index 41 around the compass card 22. As the antenna position is thus being established, the correct bearing of the transmitting station will be indicated by the position of the antenna index on the compass card, irrespective of the disposition about such card of the compass case and lubber lines 23, and hence entirely irrespective of the heading of the craft.

Consequently it is not at all necessary to know the heading of the craft in order to obtain bearings from it of several radio transmitting stations for establishing a fix of the craft's position, provided, of course, that the several bearings are taken sufficiently quickly so that the craft has not progressed along its course an appreciable distance meanwhile. Also the rolling, pitching or turning of the craft while the radio transmitting station bearings are being determined does not in any way affect the bearing readings of the antenna attitude indicator 41 on the compass card, although if the heading of the craft changes, it will be necessary to turn the antenna sufficiently to maintain its axis aligned with the transmitting station when the compass bearing reading of such station is being taken.

From the foregoing description of the operation of my direction finder, it will be evident that the reading of a radio station bearing does not depend at all upon the heading of the craft. Consequently, the lubber's lines 23 of the compass can be totally ignored when taking such readings, because they are of value only for ascertaining the craft's heading. As a matter of fact, I consider a bull's-eye type of light pattern index to be superior to the usual lubber's line employed on a compass, and where my navigational device is installed, the lubber's lines 23, shown in Figure 5, may be omitted, provided that an index pointer 15 and cooperating mark, such that the loop antenna may be set with its axis parallel to the center line of the craft, are supplied.

While a pointer 15 and graduated plate 14 to indicate the attitude of the loop antenna are customarily incorporated in conventional direction finding equipment, these elements are not necessary for my device, unless it is desired to use the light pattern index 41, carried by the antenna 1, as the reference point for determining the heading of the craft. Where it is to be used for that purpose in place of the lubber's line, its position on a radius of the compass parallel to the center line of the craft may be established by placing the pointer 15, also carried by the antenna 1, in registry with the zero graduation of plate 14. This plate, of course, is itself oriented properly with respect to the center line of the craft as previously explained. When the loop antenna is fixed in that position, the bull's-eye light pattern will be located as shown in solid lines in Figure 5.

If the antenna attitude index is to be employed only for obtaining bearings of radio transmitting stations, it may be desired to swing the index supporting member, such as tube 3, into an inoperative position. Thus when such tube is swung about its pivot 31 to the broken line position illustrated in Figure 2, the space immediately above the compass will be unobstructed.

While the proportions of the antenna attitude index mechanism shown in Figures 3 and 4 are different from the device of Figures 1 and 2, the operation is the same. In this instance the shaft 16 carries the mounting tube 32 aligned with it. As before, the light tube 3' is secured to this mounting by a pivot 31 for swinging adjustment. It is not necessary to describe the operation of this structure, because it is identical with that of the mechanism shown in Figures 1 and 2 and described previously. In order to swing the light tube from the solid line position to the broken line position shown in Figure 4, however, in this instance it may be necessary to rotate the loop antenna 11 sufficiently so that the light tube will clear the window W in the cabin C while being swung.

In the device of Figures 6 and 7, the light tube 3' again is carried by a mounting tube 32, aligned with the rotative axis of the loop antenna 11. In this instance the wheel 17 is added, but again the function and operation of the antenna attitude index mechanism is exactly the same as that shown in Figures 1 and 2 and described above. The only difference in this arrangement is the location of the customary antenna attitude reference indicator 18, 19. When the usual lubber's lines are provided on the compass, such attitude indicator may be omitted. If the light pattern projected by the tube 3' is to be used in place of the normal lubber's lines, however, for steering the craft, some antenna attitude reference indicator, such as 18 or 19, or some other mechanism must be provided to enable the loop antenna 11 to be fixed in a position in which its axis is parallel to the center line of the craft.

The device of Figure 8 does not have an antenna attitude index member which is supported in close proximity to the compass. In this instance, the face of the compass 2 is illuminated indirectly by the light 24, so that it is reflected in a convex mirror 33, mounted on the lower end of the antenna shaft 16 and generally perpendicular to it. On this mirror is a radial or diametral line, or diametral lines intersecting at right angles, which may be luminous if desired.

The compass card is reflected in the mirror 33 and again in a fixed concave mirror 34, in which the antenna attitude index line or lines is also reflected. The observer then sees the superimposed reflections of the compass card and of the antenna attitude index line or lines in mirror 34. It is evident that any other system of mirrors may be employed which will superimpose images of the antenna attitude index and the compass card.

The loop antenna arrangement of Figure 9 is the same as that of Figures 6, 7 and 8, but in this case the compass 2 is not supported in a fixed position, but, on the contrary, its mounting 25 is connected to the antenna mounting shaft 16 for conjoint movement by a member 35. The compass is journaled in a bearing 26, aligned with the antenna shaft 16, so that, as the antenna is rotated by wheel 17, the compass case and lubber's lines 23 are also rotated. While in this instance the member interconnecting the compass and the antenna is rigid, any connection which will coordinate the rotation of the antenna and of the compass mounting may be used. In this embodiment of the invention the lubber's lines themselves constitute the index rotatable with the antenna to indicate its attitude relative to the compass card, instead of being fixed relative to the longitudinal axis of the craft. With this type of an arrangement it is essential that an indicator, such as 18, be provided to register the attitude of the antenna relative to the craft's center line so that the lubber's lines may be set properly when the compass is to be used for reference in steering the craft.

With this mechanism, when the bearing of a radio transmitting station is being determined, the lubber's line adjacent to the antenna connecting member 35, which line may be illuminated by a light 27 mounted on such connecting member, will cooperate with the compass card 22 to designate the bearing of the transmitting station, subject only to correction for compass variation. When it is desired to employ the compass 2 for determining the heading of the craft, it will be necessary to place the lubber's line adjacent to connecting member 35 in a position parallel to the longitudinal axis of the craft by aligning the pointer of indicator 18 at the zero graduation.

The form of direction finding equipment shown in Figure 9 is not preferred, however, because it is usually desirable to rotate the antenna 11 rather rapidly, first in one direction and then in the other, in order to position the loop with its axis directed at the transmitting station. The coincident oscillation of the casing of compass 2 creates some drag of the liquid in the compass case on the compass card 22, which will cause the compass card itself to oscillate somewhat. For that reason, it is very difficult to obtain an accurate reading of the lubber's line on the compass card.

In the modification shown in Figures 11, 12, 13 and 14, like that of Figure 8, again there is no direct mechanical cooperation between the antenna attitude index and the compass card. In this arrangement a disk 36 is mounted on the lower end of the antenna shaft 16 in a plane perpendicular to such shaft. This disk, as shown best in Figure 13, bears an appropriate index mark, such as a radial or diametral line, or two diametral lines perpendicular to each other, designated 37. One of these may have an arrow 37' corresponding to the direction of the loop when its axis is aligned with a radio transmitting station.

The compass 2 is of the customary type and is mounted in conventional style on the mounting 20. This mounting is extended upward somewhat, however, and carries a plane mirror 38, swingably supported upon pivot 39. This mirror is not silvered over its entire surface, as is evident from Figure 14, but a clear ring is left through which the compass card 22 is visible to the eye of the navigator. In the silvered portion of the mirror, located centrally and outwardly of the unsilvered portion, and to some extent in such unsilvered portion, an image of the antenna attitude index line 37, 37' will appear. Such image is superimposed upon the compass card in much the same manner as an arrow physically suspended from shaft 16 over the compass card and in close proximity to it would be.

As the loop antenna in the device of Figures 11 and 12 is rotated, the plate 36 and antenna attitude index 37, 37' will be rotated. The reflection of such index in mirror 38 will cooperate with the compass card in the same manner as the light pattern index 41 described in connection with the navigational device of Figures 1 and 2. Again, therefore, the actual compass bearing of the radio transmitting station will be indicated directly. The mirror 38 will, of course, be tilted about its pivot 39 as necessary to place the image of the antenna attitude index in proper disposition relative to the compass card.

I claim as my invention:

1. Radio direction finding mechanism for correlating the attitude of a loop antenna with the compass card of a craft's navigational compass and wherein the loop antenna is supported for rotation about an upright axis coinciding with the rotative axis of the compass card of such compass, said mechanism comprising antenna attitude index means mounted on the loop antenna for rotation in synchronism therewith about the rotative axis of the antenna, and including means to project an antenna position index image onto the compass, said latter means comprising a light projection tube located immediately above the compass card and disposed eccentrically of such card's axis for cooperation with markings on the card's periphery, and said tube being mounted pivotally for swinging away from the compass when not being used.

2. Radio direction finding mechanism for correlating the attitude of a loop antenna with the compass card of a craft's navigational compass, comprising means supporting the loop antenna for rotation about an upright axis coinciding with the rotative axis of the compass card of such compass, antenna attitude index means including an index adapted to cooperate with the compass card, and means supporting said index means from the loop antenna for rotation in synchronism therewith, and for swinging about a generally horizontal axis between a position in which said index means are located immediately above the compass card and an inoperative position in which said index means are swung upwardly out of the region immediately above the compass.

3. Radio direction finding mechanism for correlating the attitude of a loop antenna with the compass card of a craft's navigational compass, comprising means supporting the loop antenna for rotation about an upright axis coinciding with the rotative axis of the compass card of such compass, antenna attitude index means including a light pattern projection tube detached from the compass, and means supporting said tube from the loop antenna for rotation in synchronism therewith about the rotative axis of the antenna, to project the light pattern directly onto the compass card.

4. Radio direction finding mechanism for correlating the attitude of a radio directive antenna with the compass card of a craft's navigational compass, comprising means supporting the antenna for rotation about an upright axis coinciding with the rotative axis of the compass card of such compass, antenna attitude index means including a light pattern projection tube detached from the compass, and means supporting said tube for rotation in synchronism with said antenna about its rotative axis, and inclined downwardly substantially from the rotative axis of the antenna to project the light pattern onto the periphery of the compass card.

5. Radio direction finding mechanism for correlating the attitude of a loop antenna with the compass card of a craft's navigational compass, comprising means supporting the loop antenna for rotation about an upright axis coinciding with the rotative axis of the compass card of such compass, antenna attitude index means including a light pattern projecting tube, and means supporting said tube from the loop antenna for rotation in synchronism therewith about the rotative axis of the antenna, and for swinging about a generally horizontal axis between a position located immediately above the compass card, in which it projects the light pattern onto the compass card, and an inoperative position swung upwardly out of the region immediately above the compass.

6. Radio direction finding mechanism for viewing from a craft's compass the bearing of its radio directive antenna, comprising rotatable means mounted directly over, coaxially with, and detached from the craft's compass and rotatable conjointly with the antenna, said rotatable means including light index image projecting antenna-position index means, and means to effect superposition of an index image produced by said index means and the compass card in the sense that the compass card and index image may be viewed simultaneously in superimposed relationship.

7. Radio direction finding mechanism as defined in claim 6, in which the superpositioning means comprises a light projection tube mounted for swinging about an axis at an angle to the axis of antenna rotation away from the compass, from its lowered position wherein light from said index means is projected through said tube directly onto the compass card to form thereon the light image antenna-position index.

ROLLAND C. SABINS.

REFERENCES CITED

The following references are of record in the file of this patent:

UNITED STATES PATENTS

| Number | Name | Date |
| --- | --- | --- |
| 733,910 | Ladd | July 14, 1903 |
| 1,569,745 | Hand | Jan. 12, 1926 |
| 1,693,051 | Patterson | Nov. 20, 1928 |
| 1,715,270 | Bassett | May 28, 1929 |
| 1,806,577 | Kolster | May 19, 1931 |
| 2,220,008 | Woodward et al. | Oct. 29, 1940 |
| 2,246,496 | Asbury | June 24, 1941 |
| 2,253,430 | Hunt et al. | Aug. 19, 1941 |
| 2,308,936 | Schuchardt et al. | Jan. 19, 1943 |
| 2,326,337 | Renzo | Aug. 10, 1943 |